United States Patent Office 2,719,837
Patented Oct. 4, 1955

2,719,837

CARBOXYALKYL GLOBIN AND METHOD OF PREPARATION

Edgar A. Biddison, Oakland, Calif., assignor to Cutter Laboratories, Berkeley, Calif., a corporation of California No Drawing. Application August 12, 1952,
Serial No. 304,001

6 Claims. (Cl. 260—112)

This invention relates to and in general has for its objects the provision of a non-toxic carboxyalkyl globin soluble in water at physiological pH and the provision of a method of preparing such product wherein globin is alkylated by adding a neutralized solution of an alpha halogen acetate to a cold alkaline solution of globin, and wherein the pH of said solution is maintained within the range of 7.5 to 12 by the periodic addition of alkali.

In the preparation of plasma and plasma fractions from human blood, most of the hemoglobin content thereof is wasted or discarded in spite of the fact that the hemoglobin contains about four times as much protein as does the plasma. The reason for this is that presently no entirely satisfactory method is available for converting hemoglobin into therapeutically useful products.

Hemoglobin is normally present within the red blood cells and when released therefrom into the circulatory system, it is immediately picked up by the various tissues and gradually broken down into numerous harmless but valueless excretory degradation products. If, however, large amounts of hemoglobin are administered intravenously, the resulting concentration of extracellular hemoglobin causes a severe strain on the detoxification and excretory mechanisms, and severe liver and kidney damage may result.

Hemoglobin is a so-called conjugated protein made up of a protein part known as globin and a non-protein prosthetic group known as heme. Although the literature discloses several methods for separating hemoglobin into these two component parts, the resulting globin is largely insoluble in an aqueous medium at pH values near neutrality and consequently is unsuitable for parenteral administration. For example, this is true of the globin obtained by the acid-acetone method of Anson and Mirsky as reported in the Journal of General Physiology 13, 469. Although globin obtained by this and other methods is readily soluble in an aqueous medium at pH values below 6.7 and above 9.5, it is largely insoluble within this range and which of course includes neutral or physiological pH. As is well known, solutions for parenteral administration must be nearly neutral, particularly if they possess appreciable buffering capacities, as do protein solutions.

Of the known methods of rendering the acid globin of Anson and Mirsky soluble at neutral pH values, none results in a satisfactory end product.

In one of these methods, a portion of the acid globin which is in solution as globin hydrochloride at low pH values, remains in solution when the solution is neutralized very slowly. This portion is the so-called renatured globin of Anson and Mirsky, is very unstable in solution, gradually precipitates even in the cold and is highly toxic upon parenteral administration. Whether this toxicity is due to the renatured globin per se or to some impurity from the red cells is not known.

More specifically then it is the object of this invention to provide a highly specific method for effecting the solubility of globin by forming a carboxyalkyl globin which will remain in the plasma component of the circulation and be suitable for exerting osmotic pressure. By attaining this end, three-fourths (¾) of the blood proteins now discarded or wasted when preparing plasma and plasma fractions can be used effectively in parenteral therapy in much the same manner that plasma and albumin are now used.

Preliminarily it should be noted that my method depends upon the fact that an isoelectric protein molecule in solution possesses an average total electric charge of zero, that is, equal numbers of positive and negative charges are concurrently present. These charges consist largely of ionized amino groups, which are positive, and ionized carboxyl groups, which are negative. If some or all of the ionizable amino groups are blocked by alkylation with the introduction of carboxyl groups, there should remain a preponderance of negative charges at the same pH value. The alkylated protein would be, therefore, above its isoelectric point if in a solution of the same initial pH. Before alkylation, globin is insoluble within the approximate pH range of 6.7 to 9.5. Alkylation, by lowering the isoelectric point, lowers the pH region within which the protein is insoluble. Alkylation, therefore, renders the globin soluble near neutrality.

Consistent with this theory I have found that by reacting globin with a soluble bromo-acetate, a soluble iodo-acetate, or a soluble chloro-acetate, carboxymethyl groups are added to the terminal amino groups of the protein, to the free amino groups of lysine and arginine, and to the sulfhydryl groups, of which there are only one or two per globin molecule. The reactions involved are thought to be as follows:

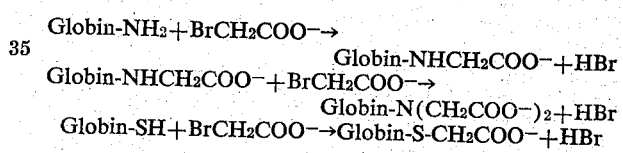

Briefly, the alkylation of globin in accordance with the method of the present invention can be effected by adding a neutralized bromoacetic acid solution to an alkaline solution of globin, and periodically readjusting the pH with alkali to an initial level which may be from pH 7.5 to 12. By alkylating globin to a maximum degree, one can obtain a globin with its isoelectric point depressed to approximately pH 3. The over-all effect of this alkylating treatment was found to confer the following desirable properties on the globin molecule:

(1) The isoelectric point is depressed because of the increased negative charge on the molecule at neutrality.

(2) The alkylated globin was more soluble and less viscous than the unmodified globin at neutrality.

(3) The greater negativity of the molecule was found to increase the Donnan effect at physiological pH. This should theoretically increase the osmotic pressure of a globin solution of appreciable concentration.

(4) Alkylation was found to contribute to the hydrophylic nature of the molecule by virtue of the larger shell of hydration which is possible on a more highly charged molecule.

(5) Alkylation reduces the possibility of interaction between globin molecules and normal plasma proteins which would tend to cancel the desired osmotic effect if the interaction takes place to any appreciable degree.

(6) The carboxyalkyl globin has a molecular weight in the order of 34,000.

More specifically and by way of example, the following procedure has been followed in attaining the objects of my invention.

A suspension of human red cells was lysed by mixing with two or more volumes of distilled water. The stroma was then separated from the red cell lysate by adjusting the pH value to within the range of 5.5 to 6.0 and then filtering very meticulously. The stroma was thereby removed as a precipitate and accounted for approximately 5.2 per cent of the total solids. The resulting hemoglobin solution was then converted to globin hydrochloride by following exactly the acid acetone method of Anson and Mirsky. One hundred grams of the globin hydrochloride prepared by the Anson and Mirsky procedure were put into solution with one liter of distilled water using mechanical stirring. The solution was then neutralized and brought up to pH 11.5 passing rapidly through the precipitate stage using 50.5 ml. of 3.8 normal sodium hydroxide altogether. Twenty-five grams of alpha-bromoacetic acid were dissolved separately in a small amount of distilled water and brought to pH 7 by adding about 1.5 grams of 50 per cent sodium hydroxide slowly and with ample cooling to keep the temperature below 10° C. The neutralized bromo-acetate solution was added all at one time to the slowly stirring globin solution at room temperature. The initial pH of 11.5 dropped to pH 10.7 in 20 minutes due to the formation of HBr as a product of the reaction. The addition of 4 ml. of 3.8 normal NaOH restored the pH to 11.15. In one hour the pH had fallen again to 10.6. The addition of 7 ml. of 3.8 normal NaOH restored the pH to 11.35. By the addition of base in small increments the pH was maintained between 10.5 and 11.5 during the course of the whole reaction, which was stopped by neutralization and cooling after 5½ hours. A total of 21 ml. of 3.8 normal NaOH was used, and the pH just before neutralization was 10.54. A one ml. aliquot of a completely clear solution was diluted to 10 ml. and it was found that it precipitated between pH 4.3 and 2.0. At all other pH values it remained a perfectly clear solution and the precipitate formed at its new isoelectric point dissolved quite readily with addition of either base or acid. The whole preparation was brought to pH 7 and dialyzed against distilled water at 4° C. The dialyzed neutral material was dried by vacuum from the frozen state. The alkylated globin can be otherwise separated from the other reaction products by precipitation at its isoelectric point followed by thorough washing with water. A yield of 85 per cent was obtained. The final dry material dissolved readily in neutral cold distilled water and is very stable when in sterile solution. A 10 per cent solution has a favorable viscosity and more concentrated solutions can be made easily.

In order to reduce the isoelectric point of globin sufficiently so that the resulting globin is soluble in water at a pH of 7.4, alkylation must proceed to the extent that at least six carboxymethyl groups are added to each globin molecule. Alkylation can be further carried on until approximately 50 carboxymethyl groups have been added to each globin molecule.

A sterile 10 per cent solution of the carboxyalkyl globin produced as above described has been repeatedly administered to animals at a dosage of 5 ml. per kg. of body weight without any evidence of toxic reaction.

Carboxyalkyl globin can also be prepared by alkylating hemoglobin in the presence of salt and then splitting the carboxyalkyl hemoglobin into carboxyalkyl globin and heme. A small amount of an electrolyte, such as sodium chloride, must be present before hemoglobin can be alkylated by this process. More specifically, carboxyalkyl globin can be prepared through the carboxyalkyl hemoglobin step by the following procedure.

Nine hundred ml. of human red cells were lysed by mixing with 1800 ml. of distilled water. The stroma was removed by adjusting the pH to a value between 5.5 and 6.0 followed by filtration. Four gm. of sodium hydroxide and 10 gm. of sodium chloride were dissolved in 50 ml. of distilled water, and 13.9 gm. of alpha-bromoacetic acid were dissolved in 16 ml. of distilled water. The two solutions were mixed together rapidly and added immediately to a one liter portion of the above filtrate from the stroma removal step. (The total electrolyte content should be at least 0.5 gm. per 100 ml.) Stirring was discontinued after thorough mixing had taken place. The pH of this mixture was 8.5. The pH was maintained between 8.0 and 9.0 for three days (at approximately 20° C.) by the periodic addition of a 20% wt./vol. sodium hydroxide solution. A total of 6.75 ml. of 20% sodium hydroxide was used during the process. Stirring was employed during these sodium hydroxide additions. During the third day, the pH was allowed to fall to 7.7, at which time a 0.5 ml. aliquot diluted to 10 ml. with water was found to precipitate between pH 5.8 and 4.5 and to remain as a clear but highly colored solution at all other pH values. The heme, or colored portion was removed by bringing the pH to within the range of 2.5–3.0 by the addition of hydrochloric acid and then slowly adding the acid solution to ten volumes of acetone (any point within the pH range of 1–4 is satisfactory for splitting off the heme). The resulting precipitate was filtered free of the heme-containing acetone, washed with a small additional portion of acetone, and air-dried. The precipitate was dissolved in water and adjusted to within the pH range of 7.0–7.4 by the addition of sodium hydroxide. The carboxyalkyl globin, prepared in this manner from carboxyalkyl hemoglobin, could be used to form stable 10% solutions which were equivalent in every respect to those prepared by the first example.

The reaction time, in forming the carboxyalkyl hemoglobin, can be reduced to a period of four to five hours by carrying on the alkylation at a pH between 10 and 11.

There is a convenient alternative method of reducing the pH of the carboxyalkyl hemoglobin to 2.5–3.0 which serves also to reduce the salt content of the carboxyalkyl hemoglobin solution prior to precipitation of the carboxylalkyl globin. The slightly alkaline carboxyalkyl hemoglobin solution can be passed through a mixed bed of a cation exchanger and an anion exchanger. As an example, each 100 ml. portion of slightly alkaline carboxyalkyl hemoglobin solution can be passed through a mixture of 27 ml. of Duolite C-10 resin (Chemical Process Co.) and 50 ml. of Amberlite IRA-400 resin (Rohm & Haas Co.). The pH will thereby be reduced to within the proper range for splitting of carboxyalkyl hemoglobin into carboxyalkyl globin and heme, and the salt content will be substantially reduced.

From the above description it is apparent that I have solubilized globin by alkylation, that the resulting globin has suitable oncotic pressure for its proposed use, and that its toxicity has been substantially reduced if not eliminated.

Having thus described my invention, what I claim and desire to secure by Letters Patent is:

1. A carboxymethyl globin, derived from human hemoglobin, soluble in water at a pH between pH 6.7 and pH 9.5.

2. A carboxymethyl globin, derived from human hemoglobin, soluble in water at pH values of 7.4 and above.

3. A globin, derived from human hemoglobin, soluble in water at a hydrogen ion concentration corresponding to pH 7.4 and containing at least 0.7 percent carboxymethyl radicals added by alkylation.

4. A carboxymethyl globin, derived from human hemoglobin, soluble in water at a pH value between pH 6.7 and pH 9.5 having a molecular weight in the order of 34,000 and each globin molecule having at least six carboxymethyl groups attached thereto.

5. The method of forming a carboxymethyl globin, derived from human hemoglobin, comprising: adding a solution of an alpha halogen acetate to an aqueous alkaline globin and maintaining the pH approximately within the range of 7.5 to 12 until the resulting carboxymethyl globin forms a substantially clear solution at pH 7 or below.

6. The method of forming carboxymethyl globin, derived from human hemoglobin, comprising: adding a solution of an alpha halogen acetate to an aqueous hemoglobin solution containing salt; maintaining the pH approximately within the range of 8 to 12 until the desired degree of alkylation is obtained; reducing the pH to within the range of 1.0 to 4.0; precipitating the carboxymethyl globin with acetone; and washing the carboxymethyl globin with acetone until the colored heme is removed.

References Cited in the file of this patent

Anson et al., "Advances in Protein Chem." (Academic Press) vol. III, pp. 185–6 (1947).

Anson et al., J. Gen. Physiol., 13, pp. 469–476 (1929–30).

Rapkine, Compt. Rend. soc. biol., 112, pp. 1294–97 (1933).

Pillemer et al., J. Exptl. Med., 70, pp. 387–97 (1939).